United States Patent [19]

Brutsman

[11] Patent Number: 4,515,188

[45] Date of Patent: May 7, 1985

[54] DRAIN APPARATUS

[76] Inventor: James W. Brutsman, 414 W. Allison Rd., Cheyenne, Wyo. 82007

[21] Appl. No.: 504,259

[22] Filed: Jun. 14, 1983

[51] Int. Cl.³ .............................................. B65B 3/04
[52] U.S. Cl. ......................................... 141/1; 141/86; 141/98; 141/106; 141/372
[58] Field of Search ................................ 141/100–110, 141/85–93, 372, 331–345, 363–366, 98

[56] References Cited

U.S. PATENT DOCUMENTS 2,366,529  1/1945  Hoff .................................... 141/106

Primary Examiner—Houston S. Bell, Jr.
Attorney, Agent, or Firm—Dean P. Edmundson

[57] ABSTRACT

Apparatus is described which is adapted for draining fluid from containers and into a collection vessel. The containers to be drained, and the collection vessel, are supported and retained by the apparatus.

17 Claims, 4 Drawing Figures

DRAIN APPARATUS

FIELD OF THE INVENTION

This invention relates to apparatus for draining fluid from containers into a collection vessel.

BACKGROUND OF THE INVENTION

Fluids that are packaged and sold in containers such as cans, cartons and even glass or plastic jugs and bottles are convenient for the purchaser to handle, transport and store. However, at the time of use of the container or package it is usually not convenient or possible to remove the entire fluid contents of the container because a portion of such contents remains adhered to the interior surfaces of the container itself. Prolonged inversion of the container over a period of hours or days is usually sufficient to enable gravity to cause the remaining contents to drain out of the container but this requires that the container remain unattended for a long period of time.

Various devices have been previously proposed for draining oil from conventional quart oil cans. For example, U.S. Pat. Nos. 4,253,504; 2,728,488; 3,192,970; 2,071,944; 2,575,809; and 2,365,533 each describe generally vertically disposed draining racks and funnels on which oil cans may be placed for a period of time in inverted position. The oil from the cans is then collected in drums, pails or pans placed under the rack. Such vertically disposed devices, however, require a considerable amount of space. For example, they must either be positioned in a corner of a building or room or they may be secured to a wall and extend upwardly, and outwardly at the bottom, for a few feet. This, of course, may present a safety hazard since it projects into ordinary work space. Although the drain devices shown in FIGS. 9–12 of U.S. Pat. No. 3,192,970 are not designed to be vertically disposed during use, those devices do not include a front wall as required by the present invention. Those devices do not provide the advantages which are provided by the apparatus of the invention. For example, the prior device is not designed to permit stacking of containers. Furthermore, the clips which hold the containers may retard the flow of fluid if improperly placed, and if they become bent they may not sufficiently secure the container. The nature of the clip is such that the container and clip must be properly aligned for use. Moreover, the prior device does not provide means for attachment of a collection vessel.

A rather elaborate and costly device is described in U.S. Pat. No. 2,199,970 which is a combination oil salvage, refuse container and display rack. In this device an oil can is inverted and held within a wire framework. Oil which drips from the can is collected by a pan which in turn drains to a large pail or receptacle contained within the device. Another elaborate and costly device is described in U.S. Pat. No. 2,191,488 which is a combination display rack, draining device and crushing apparatus. In such device an oil can is fitted with a detachable spout when the can is inverted so that the oil in the can will drain to a sump and then through a pipe to a large container situated within the device. After a can has been drained it may be placed in another portion of the device to be crushed.

In U.S. Pat. No. 2,230,180 there is described another device for reclaiming oil which includes a diamond shaped housing with an opening at the bottom end and a threaded cap secured thereto. The threaded cap enables the device to be threadably connected to a collection receptacle. Inverted oil cans fit over finger members on two sides of the device.

U.S. Pat. No. 2,369,982 describes a combination display rack and drain stand in which an inverted can is placed on a rearwardly sloped shelf. An opening between the sloped shelf and a rear wall enables the rear edge of the shelf to pass through the rear wall. Accordingly, when oil drains from the can onto the shelf, the oil also goes past the rear wall into the interior of the drain stand. The oil then drips off the rear edge of the shelf into a large funnel and thence through the funnel into a receptacle within the drain stand.

An oil recovery stand is also described in U.S. Pat. No. 2,643,030 in which inverted cans are supported by hooks within the stand. The oil then drips into a collecting pan.

SUMMARY OF THE PRESENT INVENTION

In accordance with the present invention there is provided improved apparatus for draining fluid from a container of the type having an opening at the top and for collecting the fluid in a collection vessel. The apparatus comprises:

(a) rear wall means adapted to support the top end of the container;

(b) front wall means adapted to support the container between its top end and its bottom end;

(c) a floor extending between the rear wall and the front wall, the floor being sloped toward a drain point;

(d) drain means at the drain point which is adapted to permit the fluid to drain off the floor; and (e) supporting means for supporting a collection vessel below the drain point.

The rear wall and the front wall cooperate to engage and retain the container in a tilted condition above the floor so that fluid from the container may drain from the opening at the top of the container and be collected in the collection vessel by the force of gravity.

This apparatus is very compact and may be mounted on a wall, for example, in a manner such that only a small amount of wall space is required. Thus, it is not necessary to utilize a corner of a building or room nor is it necessary to utilize several feet of vertical wall space. Accordingly, the apparatus of this invention may be fastened to a wall at any convenient location, e.g., above a work bench, counter, etc. Further, the apparatus does not project into the work space so as to create a safety hazard. The apparatus may also be attached to hooks on conventional peg board, for example.

The design of the apparatus is such that it is useful for draining a wide variety of common fluids from containers, e.g., molasses, oils, syrups, sauces, honey, ketchup, etc. The apparatus may also be adapted to support and drain containers of various sizes.

BRIEF DESCRIPTION OF THE DRAWINGS

The invention is described in more detail hereinafter with reference to the accompanying drawings wherein like reference characters refer to the same parts throughout the several views and in which.

DETAILED DESCRIPTION OF THE DRAWINGS

Figure 1:
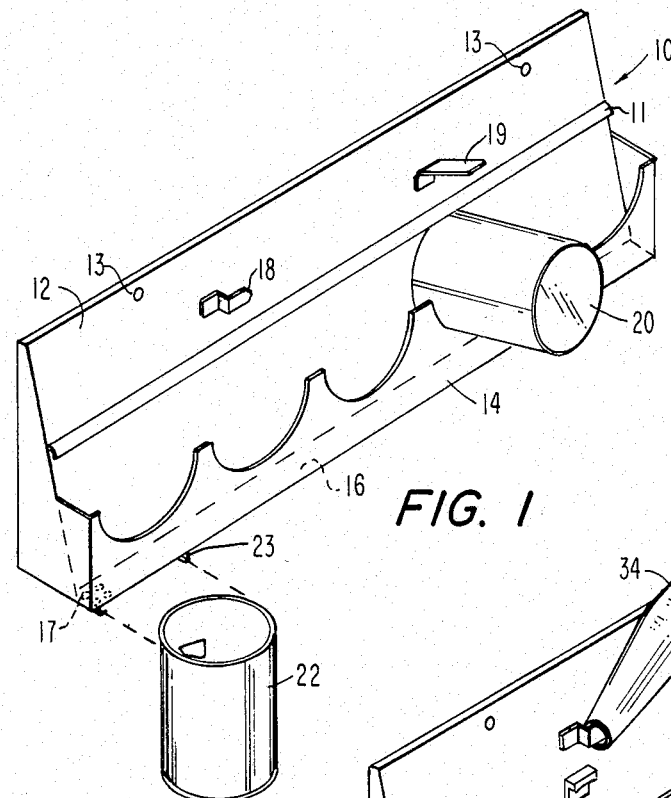
FIG. 1 is a perspective view of one embodiment of apparatus of this invention.

Thus in FIG. 1 there is shown apparatus 10 of this invention comprising rear wall 12, front wall 14, and floor 16 extending between rear wall 12 and front wall 14. Floor 16 is sloped toward one end of apparatus 10. Apertures 13 through rear wall 12 near the top thereof serve as convenient means to mount apparatus 10 on a wall, peg board or the like.

Rear wall 12 and front wall 14 cooperate with each other to engage and retain one or more containers 20 in a tilted condition above floor 16 so that the bottom of the container is supported at a level higher than the top such that fluid from container 20 may drain from an opening in its top and be collected in collection vessel 22 attached and supported below the drain point in the apparatus. The drain point of the apparatus is at the lowest point of floor 16. In FIG. 1 the drain point is at one end of the apparatus, as shown. In this embodiment openings 17 through floor 16 at the drain point permit the fluid to drain into vessel 22 located directly below it. If desired a screen or filter may be positioned in or over the drain to filter out undesired materials. It is also possible for the apparatus to have more than one drain point, if desired.

Figure 3:
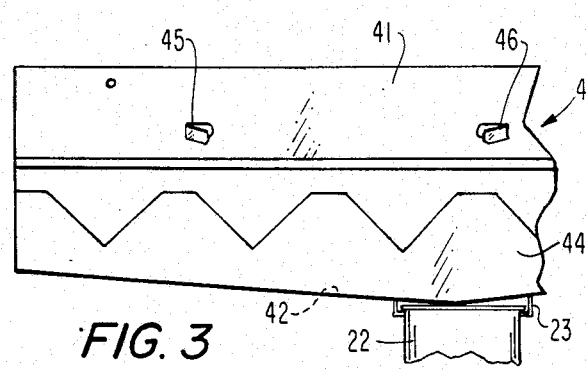
FIG. 3 is a front elevational view of another embodiment of apparatus of the invention.
Figure 4:
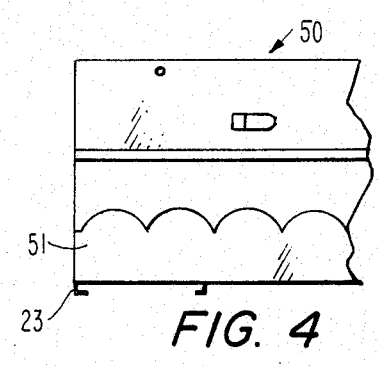
FIG. 4 is a front elevational view of yet another embodiment of apparatus of the invention.

Rear wall 12 includes forwardly projecting retention means comprising bar or ridge 11 which extends lengthwise along the face of rear wall 12. Bar or ridge 11 is adapted to engage the top rim or edge of a container and hold it in position as shown. Front wall 14 preferably includes notches along its top edge for the purpose of receiving and supporting the container between its top end and its bottom end. The top edge of wall 14 is generally horizontally disposed with respect to the apparatus, as shown in the drawings. The notches along the top edge of the front wall may be semi-circular (as shown in FIG. 1) V-shaped (as shown in FIG. 3), serrated (as shown in FIG. 4), or any other suitable style, as desired.

In the arrangement shown in the drawings, because of the relatively close proximity of the front wall to the rear wall, the container is held and supported in cantilevered fashion such that the top edge or rim of container 20 is urged upwardly against the protruding ridge or member 11.

The collection vessel 22 may be the same type of container as that being drained, for example. Vessel 22, having a top rim or edge of slightly greater diameter than the main body of vessel 22, is thereby adapted to be supported and retained on spaced track members 23 carried on the underside of floor 16. Other arrangements for attaching the collection vessel to the apparatus are also possible.

Rear wall 12 preferably slants toward the front wall 14 at its lower end. If desired, the rear wall may contact the front wall at the bottom so that a V-shaped floor is defined.

It is also convenient to include holding means on the rear wall to hold ancillary tools or equipment. For example, hook or finger members 18 and 19 affixed to the rear wall are useful for holding a spout or opener used to open the containers which later will be drained in the apparatus. A spout or opener may also be retained on the apparatus by means of a loop or holster, if desired.

The apparatus may be adapted to hold any desired number of containers to be drained. It is also possible to stack additional containers on top of a row of containers retained in the apparatus. In this manner additional containers may be drained without having to increase of the length of the apparatus. For example, the apparatus may be designed to accommodate three containers in a lower row and two containers in a top row resting on top of the lower row. This enables the apparatus to be extremely compact in design while still having large capacity.

The apparatus may be made of metal, plastic, or other suitable material. When using metal it is preferred to coat it with plastic. For example, it may be hot dipped in plastic in accordance with known and conventional techniques.

It is also possible to include a cover member with the apparatus to prevent dirt, dust and debris from getting into the fluid being drained from the containers. For example, when draining edible fluids it may be quite desirable or even necessary in some environments to include a cover member which either lifts off or is hinged at the top or bottom of the apparatus.

Figure 2:
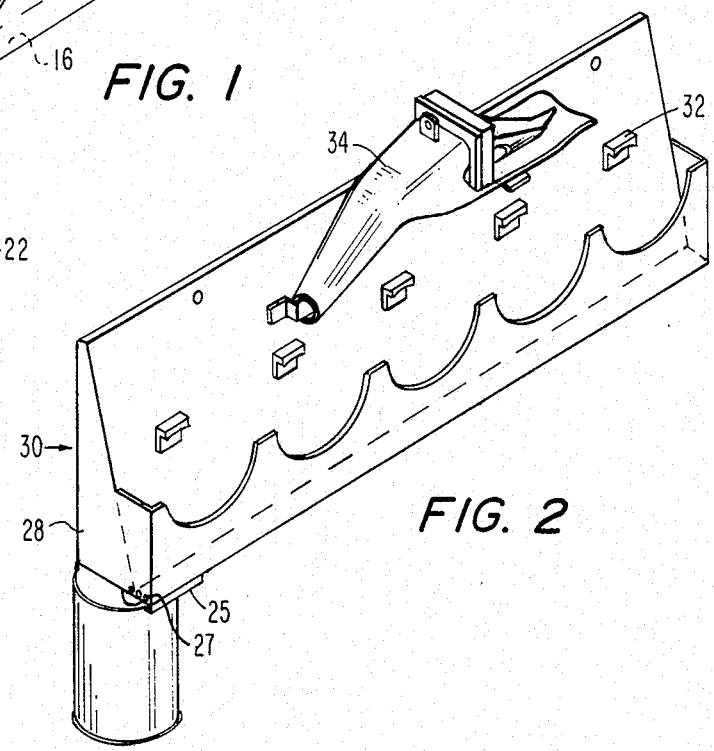
FIG. 2 is a perspective view of another embodiment of apparatus of the invention.

In FIG. 2 there is shown another embodiment of draining apparatus 30 of the invention. In this embodiment the retention means on rear wall 12 comprise individual ear members 32 which project forwardly from rear wall 12, as shown. This Figure also illustrates a spout or opener 34 supported on rear wall 12. In this embodiment the fluid drains off the left end of the floor through apertures 27 in end wall 28. Collection vessel 22 is retained on the underside of the floor of the apparatus by spaced track members 25 in a manner such that the opening in the top of vessel 22 is aligned under apertures 27.

In FIG. 3 there is shown another embodiment of draining apparatus 40 of the invention. In the embodiment the floor 42 slopes downwardly from each end to a drainpoint at the center. Collection vessel 22 is supported by the underside of floor 42 under the drain point. The front wall 44 in this embodiment includes V-shaped notches along the top edge thereof which each receive and support a side of a container to be drained. In this embodiment hook or finger members 45 and 46 have been die cut along three sides from rear wall 41 so that they may be bent forwardly by the user.

In FIG. 4 there is shown another embodiment of draining apparatus 50 in which the top edge of front wall 51 is serrated. When the side of a container rests on the top edge of wall 51 the serrations assist in inhibiting rolling or transverse movement of the container on the apparatus. Spaced track members 23 carried by the underside of the floor are adapted to retain a collection vessel.

Other variants are permissible within the scope of this invention.

What is claimed is:

1. Apparatus for draining fluid from a container of the type having an opening at the top thereof and for collecting said fluid in a collection vessel, said apparatus comprising:
   (a) rear wall means adapted to support the top end of said container;
   (b) front wall means adapted to support said container between its top end and its bottom end; wherein the top edge of said front wall means includes a notch which is adapted to receive one side of said container;

(c) a floor extending between said rear wall means and said front wall means, wherein said floor is sloped toward a drain point;
(d) drain means at said drain point which is adapted to permit said fluid to drain off said floor;
(e) supporting means which is adapted to support said collection vessel below said drain point;

wherein said rear wall means and said front wall means cooperate to engage and retain said container in a tilted condition above said floor whereby said fluid from said container may drain from said opening at the top of said container and be collected in said vessel by the force of gravity; wherein said apparatus is adapted to be mounted on a wall.

2. Apparatus in accordance with claim 1, wherein said rear wall means includes forwardly projecting retention means which is adapted to engage said top end of said container.

3. Apparatus in accordance with claim 1, wherein said rear wall means and said front wall means are adapted to engage and retain a plurality of said containers simultaneously.

4. Apparatus in accordance with claim 1, wherein said floor slopes toward one end of said apparatus.

5. Apparatus in accordance with claim 1, wherein said drain means comprises at least one aperture extending through said floor.

6. Apparatus in accordance with claim 1, wherein said floor slopes from each end thereof toward the center of said floor.

7. Apparatus in accordance with claim 1, wherein said apparatus comprises metal coated with plastic.

8. Apparatus in accordance with claim 1, wherein said apparatus comprises plastic.

9. Apparatus for draining fluid from a plurality of containers of the type having an opening at the top thereof and for collecting said fluid in a collection vessel, said apparatus comprising:
(a) rear wall means having forwardly projecting retention means;
(b) front wall means spaced from said rear wall means, wherein the top edge of said front wall means is horizontally disposed with respect to said apparatus; and wherein said top edge includes notches therealong which are adapted to receive a side of each said container;
(c) a floor extending between said rear wall means and said front wall means, wherein said floor is sloped to a drain point;
(d) drain means in said floor at said drain point which is adapted to permit said fluid to drain through said floor;
(e) supporting means carried by the underside of said floor which is adapted to support said collection vessel below said drain point;

wherein the top portion of each said container is engaged and retained by said retention means on said rear wall means, wherein the front wall means supports each said container in a manner such that each said container remains tilted sufficiently for fluid in each said container to flow out the top thereof by the force of gravity onto said floor and thence through said drain means into said collection vessel; wherein said apparatus is adapted to be mounted on a wall.

10. Apparatus in accordance with claim 9, wherein said floor slopes toward one end of said apparatus.

11. Apparatus in accordance with claim 9, wherein said drain means comprises at least one aperture extending through said floor.

12. Apparatus in accordance with claim 9, wherein said retention means on said rear wall comprises a projection member extending along the length of said rear wall.

13. Apparatus in accordance with claim 9, wherein said apparatus comprises metal coated with plastic.

14. Apparatus in accordance with claim 9, wherein said apparatus comprises plastic.

15. Apparatus in accordance with claim 9, wherein said rear wall includes protrusions adapted to support a spout.

16. Apparatus in accordance with claim 9, further including a cover member adapted to cover said apparatus.

17. A method for draining fluid from a plurality of containers, each of which has an opening at the top thereof, the method comprising the steps of:
(a) providing apparatus in accordance with claim 10;
(b) providing a collection vessel;
(c) attaching said collection vessel to the underside of said floor;
(d) tilting each said container in a manner such that the top thereof is engaged and retained by said retention means on said rear wall and each said container is supported between its top end and its bottom end by said front wall means; and
(e) permitting said fluid to drain from said containers onto said floor of said apparatus and thence through said drain means into said collection vessel.

* * * * *